C. HOFF.
SPRING WHEEL.
APPLICATION FILED NOV. 10, 1913.
1,139,285.
Patented May 11, 1915.
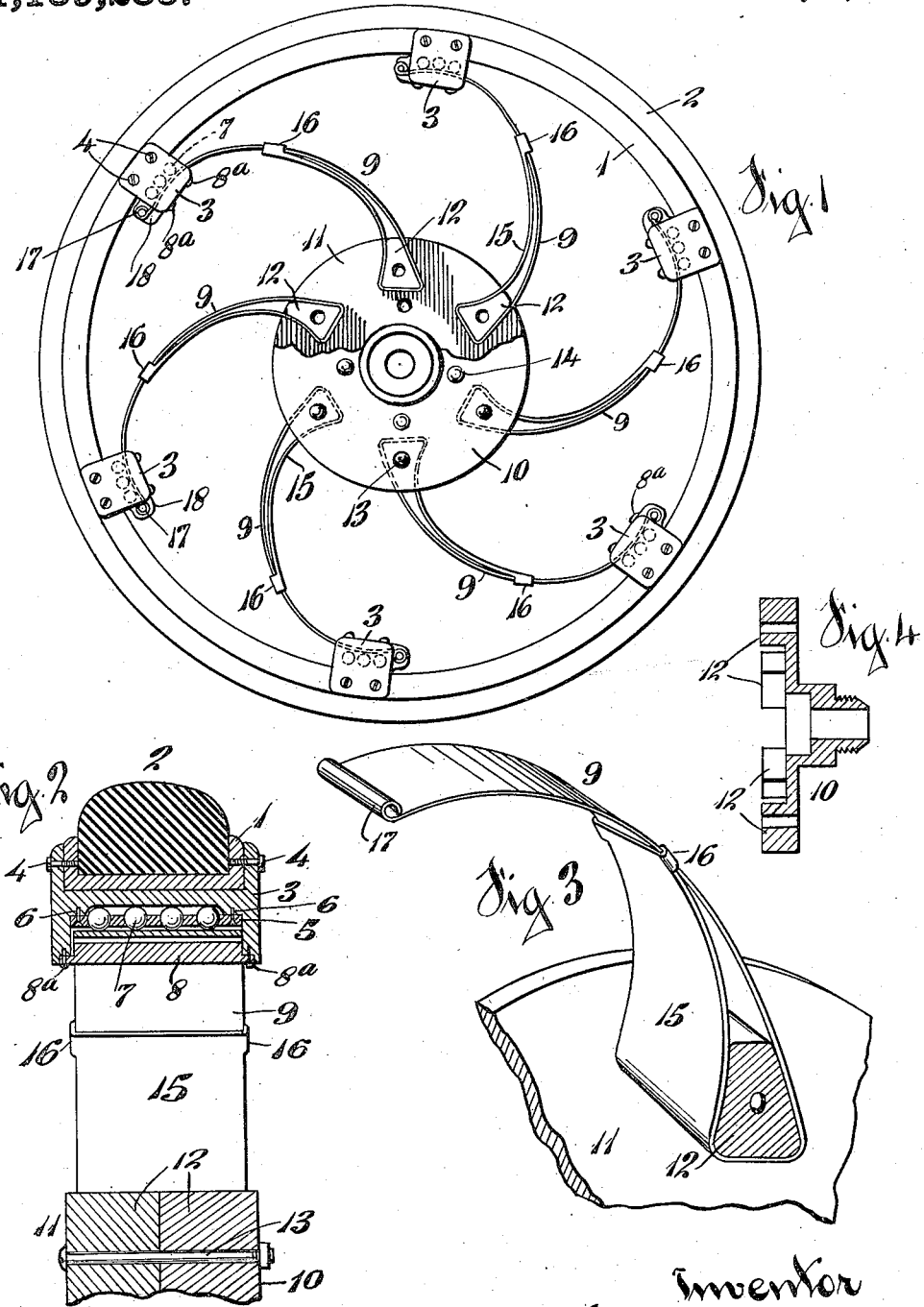

UNITED STATES PATENT OFFICE.

CHARLES HOFF, OF CINCINNATI, OHIO, ASSIGNOR OF ONE-HALF TO ANDREW OKER, OF CINCINNATI, OHIO.

SPRING-WHEEL.

1,139,285.  Specification of Letters Patent.  Patented May 11, 1915.

Application filed November 10, 1913. Serial No. 800,099.

*To all whom it may concern:*

Be it known that I, CHARLES HOFF, a citizen of the United States, and a resident of Cincinnati, in the county of Hamilton and State of Ohio, have invented a certain new and useful Improvement in Spring-Wheels, of which the following is a specification.

This invention relates to what are termed spring-wheels in which the spokes thereof are of a resilient nature and are intended to either aid the ordinary elliptical or platform springs of a vehicle in supporting the bed or body or in taking the place of the said ordinary elliptical or platform springs altogether, all according to the purposes of the vehicle for either heavy or light work as the case might be.

The object of the invention is to supply in a vehicle wheel a series of spokes that are made of resilient material and held at their inner ends between centrally-orificed hub plates or disks and adapted to project tangentially from said hub plates or disks so that their outer ends shall engage clips mounted equidistantly apart along the inner face of the rim of the wheel, said outer ends of the spokes being also adapted to bear and slightly slide or reciprocate on balls carried by said clips.

The details of structure will be fully hereinafter described and then particularly pointed out in the claim that follows.

In the accompanying sheet of drawings, Figure 1 is an elevation of the wheel, showing part of the outer hub plate or disk broken away; Fig. 2, a transverse section (on a slightly larger scale than that of Fig. 1) showing the rim, the tire, the peculiar clip, the ball tray, the balls, the resilient spoke and the two hub plates or disks, the latter being broken off; Fig. 3, a detail perspective of one of the resilient spokes showing its manner of mounting on a fragment of the inner one of the hub plates or disks; and Fig. 4, a detail cross-section of the outer one of the said hub plates or disks.

1 indicates the rim, made of wood or the like and having the usual outer groove for accommodating the tire 2, the latter being shown as a solid rubber one in Fig. 2, but a tubular inflatable one may be used instead, as I do not confine myself to either or any particular form of tire.

3 indicates each one of a series of any suitable number of equidistant clips arranged along the inner face of the rim 1 and firmly secured to the latter by means of screws or the like 4. These clips are forked for spanning-engagement with the rim, as best seen in Fig. 2, so that they shall be properly held against lateral play. The inner face of each clip is countersunk to form a ball-chamber, a ball-tray 5 being secured in a detachable manner therein by means of screws 6 and having perforations that carry the balls 7 so that they will not outwardly escape but still project slightly beyond the bottom of the tray.

A lid or plate 8 is used and secured by screws 8ª to close the outer face of each of the clips, (all as best seen in Fig. 2), a suitable space being provided between said lid or plate and the projecting peripheries of the balls 7 for the purpose that I shall refer to hereinafter.

9 indicates each one of a series of spokes composed of resilient metal, (preferably steel plates or strips of a suitable width), and held so as to project tangentially from between a pair of hub plates or disks, 10 indicating the outer disk and 11 the inner one.

The inner ends of the spokes are looped for engagement over lugs or filler-blocks 12 that project from the inner adjacent faces of both the hub plates or disks and meet in abutting relation or contact when the wheel is assembled, transverse bolts 13 being used to connect the disks together, and auxiliary connecting-bolts 14 being also used nearer the center of the wheel.

The loop portions 15 of the spring-spokes 9 extend outwardly along the inner curved faces of the said spokes and form a reinforce therefor, as well as an increased resiliency to suit the variable weights of load to which the wheel is subjected and the vehicle itself is adapted in use.

The outer end of each loop-extension 15 is preferably provided with inwardly-turned lateral projections 16 that serve as guides and means to prevent any lateral play of said extension when it slides along the under face of the body portion of the spring.

The hub plates or disks 10 and 11 also serve to prevent any lateral play of the springs.

In fitting or assembling the parts together to form the spring-wheel herein, the inner loop-ends of the spring-spokes are readily seated over the lugs or filler-blocks 12 on the inner disk 11; then the outer disk 10 is placed so that the circular series of lugs or filler-blocks 12 enter the said loop-ends of the spokes, meeting the previously seated lugs 12 of the inner disk half way; then the transverse bolts 13 are inserted and secured; then the auxiliary-bolts 14 are inserted and secured; and then the outer ends of the body portions of the respective spokes are inserted in the already attached clips along the rim, the lids or plates 8 having been first removed and then again attached or secured as soon as the hook-ends 17 of the spokes pass outwardly just beyond the further-sides of the several clips, with the outer faces of the spokes bearing against the balls 7, the latter feature being as best seen in Fig. 2.

The hook-ends 17 are preferably bent over into that form so that the springs cannot slip or escape backwardly from the clips.

In use, the spring-spokes of the wheels absorb or take the stress vertically, horizontally and radially throughout the wheels, and the vehicle is effectively relieved of all shocks in the continuous cushioning and resilient actions of said spring-spokes during the revolutions of said wheels.

I claim:—

A spring-wheel comprising a rim having a series of equi-distant clips, ball boxes or chambers provided in said clips and having detachable perforated trays, balls freely mounted in said detachable trays, a series of resilient flat metal spokes or arms each having outer hook-ends that are adapted to slidingly-engage the said balls and, also, having inner loop-ends that extend outwardly along part of the body portion to reinforce same and are provided with inwardly-turned lateral extensions that freely engage said body portions, and a pair of centrally-orificed hub plates provided with alining and contacting inwardly-projecting lugs that are adapted for uniting-engagement with the said inner loop-ends of the resilient spokes or arms to readily and firmly hold the latter in operating position in the wheel.

CHARLES HOFF.

Witnesses:
JOHN ELIAS JONES,
WILLIAM SCHURCHARDT.

Copies of this patent may be obtained for five cents each, by addressing the "Commissioner of Patents, Washington, D. C."